(12) United States Patent
Liu et al.

(10) Patent No.: US 11,947,137 B2
(45) Date of Patent: Apr. 2, 2024

(54) METHOD FOR COMPOSITE MEMBRANE AND COMPOSITE MEMBRANE

(71) Applicant: SHENZHEN SKYWORTH-RGB ELECTRONIC CO., LTD, Shenzhen (CN)

(72) Inventors: Xin Liu, Shenzhen (CN); Junping You, Shenzhen (CN); Jian Li, Shenzhen (CN)

(73) Assignee: SHENZHEN SKYWORTH-RGB ELECTRONIC CO., LTD, Shenzhen (CN)

( * ) Notice: Subject to any disclaimer, the term of this patent is extended or adjusted under 35 U.S.C. 154(b) by 902 days.

(21) Appl. No.: 16/970,076

(22) PCT Filed: Jun. 28, 2019

(86) PCT No.: PCT/CN2019/093433
§ 371 (c)(1),
(2) Date: Aug. 14, 2020

(87) PCT Pub. No.: WO2020/007233
PCT Pub. Date: Jan. 9, 2020

(65) Prior Publication Data
US 2023/0152499 A1    May 18, 2023

(30) Foreign Application Priority Data

Jul. 5, 2018  (CN) .......................... 201810730811.5

(51) Int. Cl.
*G02B 5/04* (2006.01)
*G02B 5/02* (2006.01)
*G02B 27/00* (2006.01)

(52) U.S. Cl.
CPC ........... *G02B 5/045* (2013.01); *G02B 5/0226* (2013.01); *G02B 27/0012* (2013.01)

(58) Field of Classification Search
CPC ... G02B 5/045; G02B 5/0226; G02B 27/0012
(Continued)

(56) References Cited

U.S. PATENT DOCUMENTS

2007/0110386 A1   5/2007  Chiang
2009/0311486 A1*  12/2009 Kim ..................... G02B 5/0215
                                                        428/172

FOREIGN PATENT DOCUMENTS

CN       1534348 A       10/2004
CN     201166306 Y       12/2008
(Continued)

OTHER PUBLICATIONS

Patent translation for KR20120072160Al (Year: 2012).*
(Continued)

*Primary Examiner* — Laura K Tso
(74) *Attorney, Agent, or Firm* — Maier & Maier, PLLC

(57) ABSTRACT

A composite membrane, including a base plate; the base plate is used for corresponding to a light source, and an emergent surface of the base plate is provided thereon with multiple dispersive prism areas and multiple diffusion plates, wherein the dispersive prism areas correspond to lamp bead shadow areas, and the diffusion plates correspond to non-lamp bead shadow areas; the dispersive prism areas are provided in areas in which light energy is distributed unevenly, while only the diffusion plates are laid in areas in which light energy is distributed evenly, and the dispersive prisms need not be laid, thereby reducing production costs while improving the phenomenon of a visual effect being uneven. Further provided is a design method for a composite membrane.

16 Claims, 6 Drawing Sheets

(58) Field of Classification Search
USPC .......................................................... 362/339
See application file for complete search history.

(56) References Cited

FOREIGN PATENT DOCUMENTS

| | | |
|---|---|---|
| CN | 101452086 A | 6/2009 |
| CN | 101957464 A | 1/2011 |
| CN | 102364239 A | 2/2012 |
| CN | 102736146 A | 10/2012 |
| CN | 103048709 A | 4/2013 |
| CN | 103439830 A | 12/2013 |
| CN | 203396970 U | 1/2014 |
| CN | 203413546 U | 1/2014 |
| CN | 203744019 U | 7/2014 |
| CN | 104456312 A | 3/2015 |
| CN | 106886067 A | 6/2017 |
| CN | 106908874 A | 6/2017 |
| CN | 206594324 U | 10/2017 |
| CN | 107621728 A | 1/2018 |
| CN | 206990985 U | 2/2018 |
| CN | 108957606 A | 12/2018 |
| KR | 20110033052 A | 3/2011 |
| KR | 1020120072160 A | 7/2012 |
| TW | 201222093 A | 6/2012 |
| WO | 2013/008797 A1 | 1/2013 |
| WO | 2013/115020 A1 | 8/2013 |

OTHER PUBLICATIONS

Google patent translation for CN103439830A; 10 pages. (Year: 2013).*

Google patent translation for CN203744019U; 5 pages. (Year: 2014).*

International Search Report dated Oct. 10, 2019 in corresponding International application No. PCT/ CN2019/093433; 6 pages.

First Office Action dated Feb. 6, 2020 in corresponding Chinese application No. 201810730811.5; 21 pages.

Office Action dated Nov. 16, 2020, in connection with corresponding Chinese Application No. 201810730811.5; 11 pages.

Extended European Search Report dated Jul. 27, 2021, in connection with corresponding European Application No. 19831124.3; 9 pages.

Office Action dated Jun. 30, 2021, in connection with corresponding Indian Application No. 202027036996 (5 pp., Including machine-generated English translation).

First Examination Report dated Feb. 6, 2020, in connection with corresponding CN Application No. 201810730811.5 (21 pp., including machine-generated English translation).

Second Examination Report dated Aug. 14, 2020, in connection with corresponding CN Application No. 201810730811.5 (21 pp., including machine-generated English translation).

* cited by examiner

METHOD FOR COMPOSITE MEMBRANE AND COMPOSITE MEMBRANE

CROSS-REFERENCES TO RELATED APPLICATIONS

This application is a national stage application of PCT Patent Application No. PCT/CN2019/093433, filed on 28 Jun. 2019, which claims priority to Chinese Patent Application No. 201810730811.5 filed on 5 Jul. 2018, the content of all of which is incorporated herein by reference.

FIELD

The present disclosure relates to the technical field of backlight modules, and more particularly, to a design method for a composite membrane and the composite membrane.

BACKGROUND

Due to a limitation of lens technology and a trend requirement of cost reduction, for a backlight module having a same size, a number of a plurality of LED light sources used is becoming less and less, while a space between the LED light sources increases accordingly, which makes both a direct-lit backlight module and a side-lit backlight module have a problem of an uneven visual effect. For the direct-lit backlight module, a poor light mixing may appear in the visual effect, which is shown as a light spot phenomenon including a plurality of bright spots or a plurality of dark spots on a lamp; for the side-lit backlight module, it is shown as a lamp bead shadow problem including a plurality of bright lights and a plurality of dark lights alternating in the visual effect.

Therefore, the present technology needs to be improved and developed.

SUMMARY

A technical problem to be solved by the present disclosure is to, in view of the defects described above in the prior art, provide a design method for a composite membrane and the composite membrane, aimed at improving the phenomenon of uneven visual effect of the backlight module.

The technical solutions of the present disclosure are as follows:

A design method for a composite membrane, comprising a plurality of steps:
arranging a test board on a light-emitting surface of a plurality of LED light sources, and turning on the LED light sources;
establishing a rectangular test area corresponding to each of the LED light sources on the test board, and detecting a brightness uniformity on each of the rectangular test areas;
comparing the brightness uniformity with a preset value, defining a rectangular test area having the brightness uniformity less than the preset value as a lamp bead shadow area; and defining both a rectangular test area having the brightness uniformity greater than the preset value, and a plurality of areas on the test board other than the rectangular test areas, as a non-lamp bead shadow area;
arranging a base plate on a light-emitting surface of the plurality of LED light sources, and arranging a plurality of dispersive prism areas and a plurality of diffusion plates on a light-emitting surface of the base plate, respectively, while making the dispersive prism areas correspond to the lamp bead shadow areas, and making the diffusion plates correspond to the non-lamp bead shadow areas.

The design method for the composite membrane, wherein the step of establishing the rectangular test area corresponding to each of the LED light sources on the test board, and detecting the brightness uniformity on each of the rectangular test areas, comprises specifically:
establishing a rectangular test area corresponding to each of the LED light sources on the test board;
selecting nine test points arranged in three rows and three columns in the rectangular test area, and detecting a brightness of the nine test points respectively;
calculating a ratio of a sum of the brightness of the nine test points, except for a middle test point, to the brightness of the middle test point, and obtaining the brightness uniformity of the rectangular test area.

The design method for the composite membrane, wherein a test point in middle of the nine test points corresponds to a center of the LED light source.

The design method for the composite membrane, wherein the test point in middle of the nine test points is located at a center of the rectangular test area, a space between every two adjacent rows of the LED light sources is equal, and a space between every two adjacent columns of the LED light sources is equal.

The design method for the composite membrane, wherein the step of arranging the base plate on the light-emitting surface of the plurality of LED light sources, and arranging the plurality of dispersive prism areas and the plurality of diffusion plates on the light-emitting surface of the base plate, respectively, while making the dispersive prism areas correspond to the lamp bead shadow areas, and the diffusion plates correspond to the non-lamp bead shadow areas, comprises specifically:
arranging the base plate on the light-emitting surface of the plurality of LED light sources, fixing a first quadrangular surface of a plurality of dispersive prisms to the light-emitting surface of the base plate, and arranging the plurality of dispersive prisms into a dispersive prism matrix corresponding to an area and a position according to the areas and the positions of the lamp bead shadow;
arranging a coating layer with an equal area on a light-emitting surface of the base plate at a position corresponding to the non-lamp bead shadow, and arranging a plurality of diffusion particles on the coating layer, while the plurality of diffusion particles are arranged in a matrix.

The design method for the composite membrane, further comprising a plurality of steps of:
fixing a plurality of first diffusion particles on both the second quadrangular surface and the third quadrangular surface of the dispersive prisms;
arranging a coating layer on a light incidence surface of the base plate;
arranging a plurality of second diffusion particles on a surface of the coating layer against the base plate.

The design method for the composite membrane, wherein the dispersive prism area comprises a plurality of first dispersive prisms and a plurality of second dispersive prisms, a height of the second dispersive prisms is smaller than a height of the first dispersive prisms, and the first dispersive prisms and the second dispersive prisms are arranged alternately.

A composite membrane, comprising a base plate, the base plate is applied to correspond to a light source, a light-emitting surface of the base plate has a plurality of dispersive prism areas and a plurality of diffusion plates arranged, wherein the dispersive prism areas are corresponding to the lamp bead shadow areas, and the diffusion plates are corresponding to the non-lamp bead shadow areas.

The composite membrane, wherein the base plate is a PET base plate.

The composite membrane, wherein the diffusion plate comprises a coating layer arranged on the light-emitting surface of the base plate, and a plurality of diffusion particles arranged on a surface of the coating layer against the base plate.

The composite membrane, wherein the coating layer is a UV photosensitive adhesive coating layer.

The composite membrane, wherein the dispersive prism area comprises a plurality of dispersive prisms arranged in a matrix, a first quadrangular surface of the dispersive prism attaches to the base plate, a surface against the base plate of a second quadrangular surface and a third quadrangular surface of the dispersive prism has a plurality of first diffusion particles arranged.

The composite membrane, wherein the first diffusion particles are hemispherically shaped, while the second quadrangular surface and the third quadrangular surface of the dispersive prism are in contact with a plane of the first diffusion particle, correspondingly and respectively.

The composite membrane, wherein the dispersive prism area comprises a plurality of first dispersive prisms and a plurality of second dispersive prisms, a height of the second dispersive prism is smaller than a height of the first dispersive prism, while the first dispersive prism and the second dispersive prism are arranged alternately.

The composite membrane, wherein a distance from a top of the first dispersive prism and a top of the second dispersive prism is 30 μm-50 μm.

Benefits: The present disclosure arranges a plurality of dispersive prism areas and a plurality of diffusion plates on the light-emitting surface of the base plate, while the dispersive prism areas are corresponding to the lamp bead shadow areas, and the diffusion plates are corresponding to the non-lamp bead shadow areas. Arranging the dispersive prism areas in an area with an uneven light energy distribution, while laying out the diffusion plates only in an area with an even light energy distribution, without any needs to lay the dispersive prisms, so as to improve a phenomenon of uneven visual effects and reduce a production cost.

DETAILED DESCRIPTION OF EMBODIMENTS

In order to make the purposes, technical solutions, and effects of the present disclosure clearer and more specific, the present disclosure will be described in further details below. It should be understood that the specific embodiments described herein are only used to explain the present disclosure and are not intended to limit the present disclosure.

Figure 1:
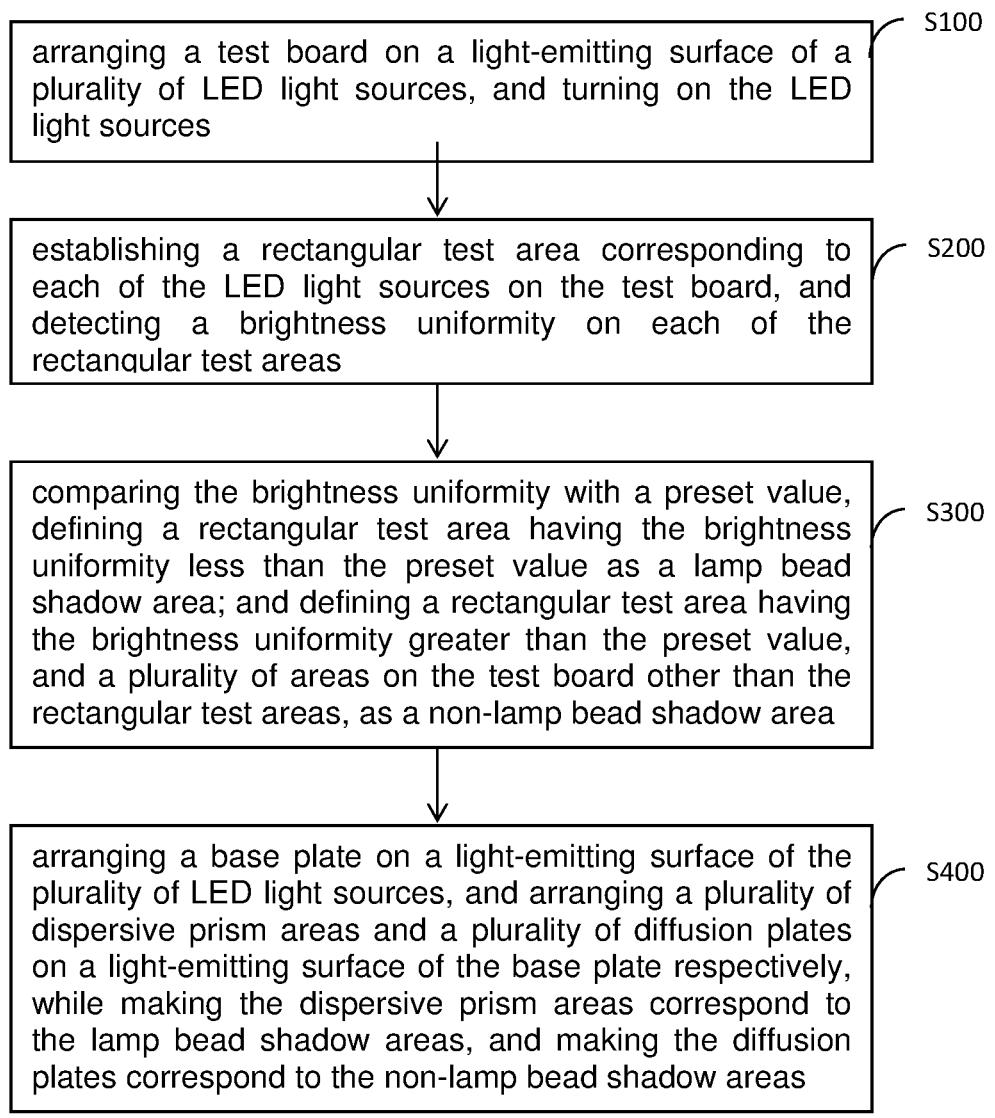
FIG. 1 illustrates a flowchart on a design method for the composite membrane in the present disclosure.
Figure 2:
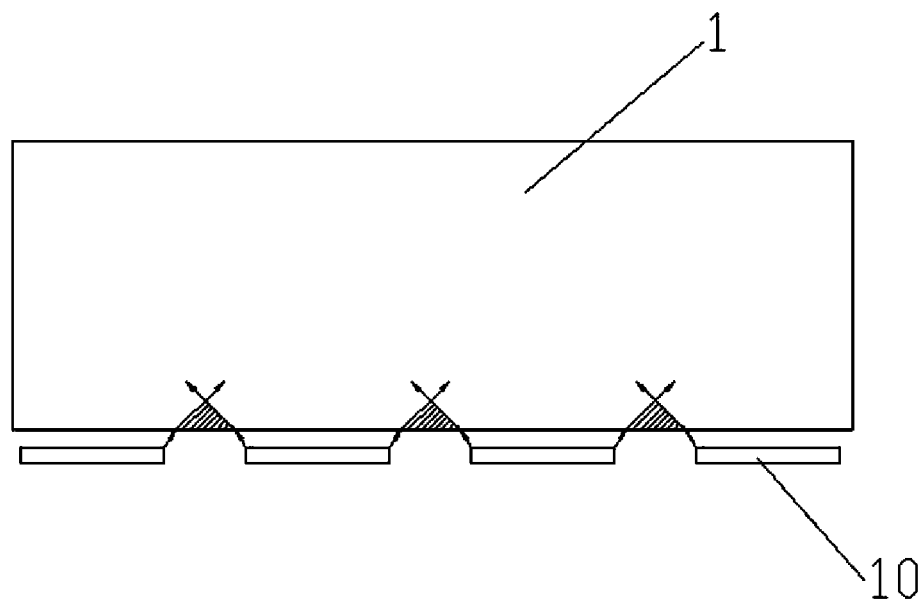
FIG. 2 illustrates a schematic structural diagram on a direct-lit backlight module in the present disclosure.
Figure 3:
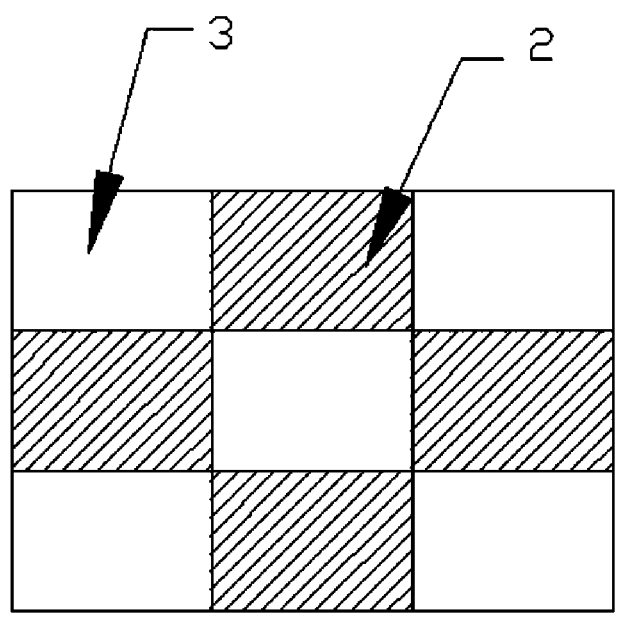
FIG. 3 illustrates a schematic diagram on a distribution of a lamp bead shadow areas and a non-lamp bead shadow areas on a test board of the direct-lit backlight module in the present disclosure.
Figure 4:
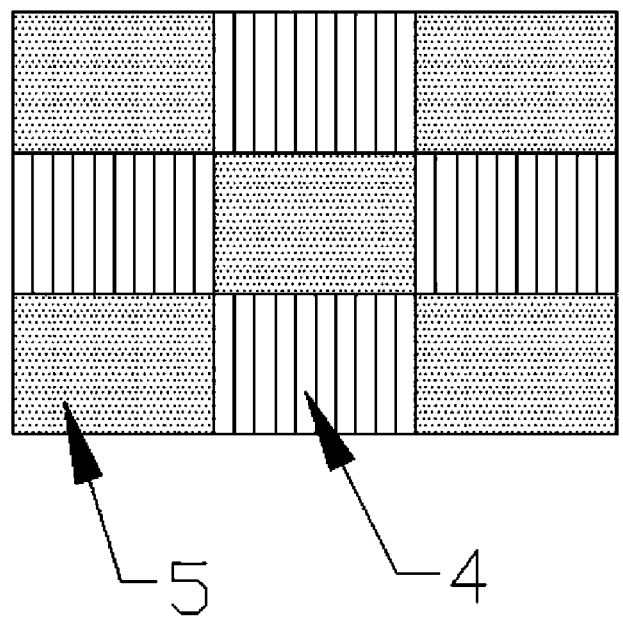
FIG. 4 illustrates a schematic diagram on a distribution of a plurality of dispersive prism areas and a plurality of diffusion plates on the composite membrane corresponding to the direct-lit backlight module in the present disclosure.
Figure 5:
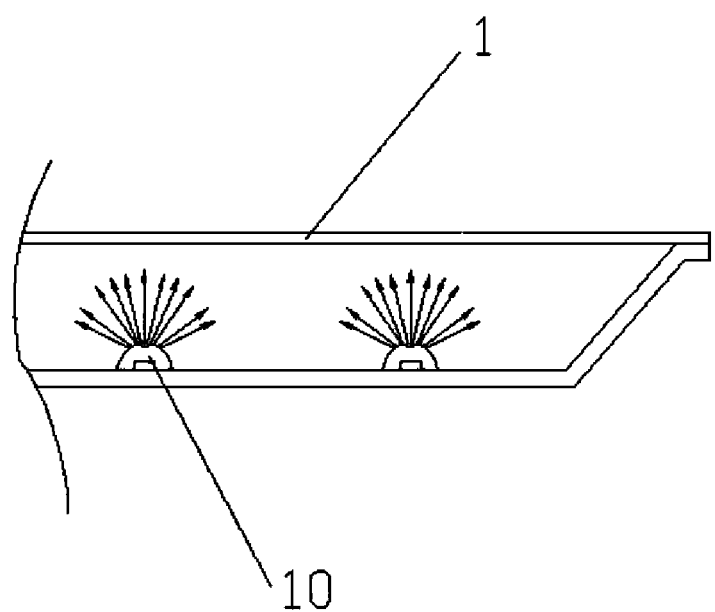
FIG. 5 illustrates a schematic structural diagram on a side-lit backlight module in the present disclosure.

Referencing FIGS. 1-11, wherein a plurality of arrows in FIG. 2 and FIG. 5 illustrates a light emitting direction.

Embodiment 1

The present disclosure provides a design method for a composite membrane, shown as FIG. 1, comprising a plurality of steps below:

S100, arranging a test board 1 on a light-emitting surface of a plurality of LED light sources 10, and turning on the LED light sources 10.

In a preferred embodiment, as shown in FIG. 2 and FIG. 5, the composite membrane is suitable for both a direct-lit backlight module and a side-lit backlight module; for the direct-lit backlight module, the test board 1 in the present disclosure is a diffusion plate; for the side-lit backlight module, the test board 1 in the present disclosure is a light guide plate. In the direct-lit backlight module, the plurality of LED light sources 10 are arranged in a matrix on a back plate, and a total rectangular area covered by the plurality of LED light sources 10 on the back plate has an area smaller than an area of a surface of the test board 1 facing toward the LED light source 10, and the area of the surface of the test board 1 facing toward the LED light source 10 increases following a distance increase between the test board 1 and the LED light source 10, that is, the smaller a distance between the test board 1 and the LED light source 10 is, the smaller an area of the test board 1 needed is; the bigger the distance between the test board 1 and the LED light source 10 is, the bigger the area of the test board 1 needed is.

S200, establishing a rectangular test area corresponding to each of the LED light sources 10 on the test board 1, and detecting a brightness uniformity on each of the rectangular test areas.

The step S200 comprises specifically:

S201, establishing a rectangular test area corresponding to each of the LED light sources 10 on the test board 1;

specifically, establishing a rectangular test area correspondingly on the test board 1 for each LED light source 10, and by checking a brightness uniformity of each rectangular test area, it is decided whether the rectangular test area belongs to a lamp bead shadow area 2 (a non-uniform visual effect area) or a non-lamp bead shadow area 3 (a uniform visual effect area), so as to determine whether to set a dispersive prism area 4 correspondingly or to set a diffusing plate 5 correspondingly according to a position and an area of the rectangular test area.

The rectangular test area faces the LED light source 10 directly, and the rectangular test area completely covers an area where the LED light source 10 generates a light shadow on the test board 1; preferably, a center point of the rectangular test area corresponds to a center point of the LED light source 10, a length of the rectangular test area is L, and a width thereof is H.

S202, selecting nine test points arranged in three rows and three columns in the rectangular test area, and detecting a brightness of the nine test points respectively.

Figure 8:
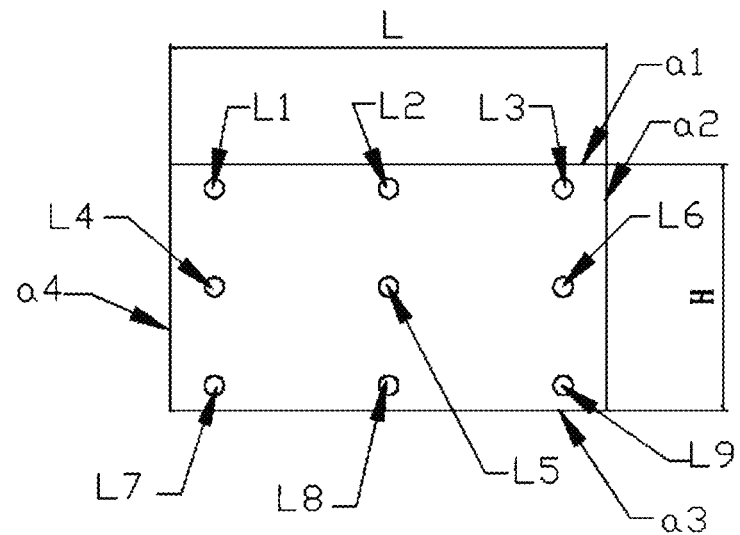
FIG. 8 illustrates a schematic diagram on a distribution of the nine test points in the rectangular test area of the present disclosure.

Specifically, shown as FIG. 8, nine test points in the rectangular test area are selected: L1, L2, L3, L4, L5, L6, L7, L8, and L9, while the nine test points are arranged in three rows and three columns, a space between every two adjacent rows is equal, and a space between every two adjacent columns is equal. That is, a distance between L1 and L2 equals to a distance between L2 and L3, a distance between L1 and L4 equals to a distance between L4 and L7. A test point located in middle of the nine test points is L5, a center of the LED light source 10 corresponding to the rectangular test area corresponds to L5, and L5 is also located at a center of the rectangular test area.

The rectangular test area comprises a first side a1, a second side a2, a third side a3, and a fourth side a4 connecting end to end in a sequence, wherein a length of the first side a1 is L, and a length of the second side a2 is H. A row in which L1, L2, L3 are located is parallel to the first side a1, and a column in which L1, L4, L7 are located is parallel to the second side a2. A distance between L1 and the first side a1 equals to a distance between L7 and the third side a3, and a distance between L1 and the fourth side a4 equals to a distance between L3 and the second side a2.

In an embodiment, the distance between L1 and the first side a1 is H/10, a distance between L1 and L2 is 0.4 L, the distance between L1 and the fourth side a4 is L/10, both a distance between L2 and the second side a2 and a distance between L2 and the fourth side a4 is L/2, both a distance between L5 and the first side a1 and a distance between L5 and the third side a3 is H/2; a brightness at each of the test points according to a position of the nine test points is detected, wherein, a brightness of the test point L1 is A1, a brightness of the test point L2 is A2, a brightness of the test point L3 is A3, a brightness of the test point L4 is A4, a brightness of the test point L5 is A5, a brightness of the test point L6 is A6, a brightness of the test point L7 is A7, a brightness of the test point L8 is A8, a brightness of the test point L9 is A9.

S203, calculating a ratio of a sum of the brightness of the nine test points, except for a middle test point, to the brightness of the middle test point, and obtaining the brightness uniformity of the rectangular test area.

Specifically, after obtaining the brightness of each test point, the sum of the brightness of all the test points except for the middle test point is calculated, taking the middle test point as L5, that is, calculating a sum S of A1, A2, A3, A4, A6, A7, A8 and A9; the ratio of S to the brightness of the test point L5 is then calculated, that is, by calculating S/A5, the brightness uniformity of the rectangular test area will be obtained.

S300, comparing the brightness uniformity with a preset value, defining a rectangular test area having the brightness uniformity less than the preset value as the lamp bead shadow area 2; and defining the rectangular test area having the brightness uniformity greater than the preset value, and the plurality of areas on the test board 1 other than the rectangular test areas as the non-lamp bead shadow area 3;

Specifically, the brightness uniformity of each rectangular test area is compared with the preset value to determine whether the rectangular test area is the lamp bead shadow area or the non-lamp bead shadow area. Preferably, the preset value is 80%; when the brightness uniformity is less than 80%, the rectangular test area corresponding to the brightness uniformity is the lamp bead shadow area 2, and so a light energy is unevenly distributed, and it is needed to set the dispersive prism area 4; when the brightness uniformity is greater than 80%, the rectangular test area corresponding to the brightness uniformity is the non-lamp bead shadow area 3, and so the light energy is distributed evenly, and only the diffusion plates 5 are needed to lay to improve the light energy uniformity in this area, without a need to lay a dispersive prism, thus a production cost is reduced, while a phenomenon of an uneven visual effect at a same time is improved; a plurality of areas on the test board 1 other than all of the rectangular test areas are the non-lamp bead shadow areas 3.

S400, arranging a base plate 100 on a light-emitting surface of the plurality of LED light sources 10, and arranging a plurality of dispersive prism areas 4 and a plurality of diffusion plates 5 on a light-emitting surface of the base plate 100 respectively, while making the dispersive prism areas 4 correspond to the lamp bead shadow areas 2, and the diffusion plates 5 correspond to the non-lamp bead shadow areas 3.

The step S400 comprises specifically:
S401, arranging the base plate 100 on the light-emitting surface of the plurality of LED light sources 10, fixing a first quadrangular surface of a plurality of dispersive prisms 101 to the light-emitting surface of the base plate 100, and arranging the plurality of dispersive prisms 101 into a dispersive prism matrix corresponding to an area and a position according to the areas and the positions of the lamp bead shadow;
S402, arranging a first coating layer 105a with an equal area on the light-emitting surface of the base plate at a position corresponding to the non-lamp bead shadow, and arranging a plurality of diffusion particles 102 on the first coating layer 105a, while the plurality of diffusion particles 102 are arranged in a matrix.

Figure 7:
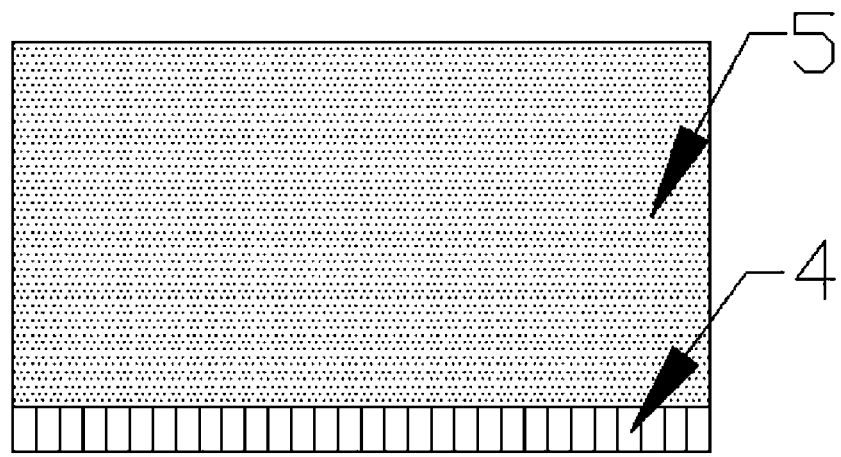
FIG. 7 illustrates a schematic diagram on a distribution of the dispersive prism areas and the diffusion plates on the composite membrane corresponding to the side-lit backlight module in the present disclosure.

Specifically, an area of the base plate 100 is equal to an area of the test board 1, the base plate 100 is arranged on a light-emitting surface of the LED light source 10; the dispersive prism area 4 and the diffusion plate 5 are arranged on a light-emitting surface of the base plate 100, that is, the surface of the base plate 100 is arranged against the LED light source 10; as shown in FIGS. 4 and 7, according to a position of the lamp bead shadow area 2, a dispersive prism area 4 is arranged correspondingly on the base plate 100, and an area that the dispersive prism area 4 covers on the base plate 100 is equal to an area of the rectangular test area. The dispersive prism 101 comprises three quadrangular surfaces (a first quadrangular surface 101a, a second quadrangular surface 101b and a third quadrangular surface 101c, respectively) and two triangular surfaces, while the first quadrangular surface 101a of the dispersive prism is stuck by an adhesive on the base plate 100, a plurality of dispersive prisms are arranged in a matrix, and two adjacent dispersive prisms are in contact.

Based on a position of the non-lamp bead shadow area 3, a plurality of diffusion plates 5 are arranged at a plurality of positions on the base plate 100; accordingly, an area that the diffusion plates 5 covers on the base plate 100 equals to the area of the rectangular test area. The diffusion plate 5 comprises a first coating layer 105a and a plurality of diffusion particles 102, a first coating layer 105a with an area equal to the rectangular test area is placed at a position of the base plate 100 corresponding to the non-lamp bead shadow area 3, and a plurality of diffusion particles 102 are arranged on a surface of the first coating layer 105a against the base plate 100, wherein the plurality of diffusion particles 102 are arranged in a matrix, with a space between two adjacent diffusion particles 102, and the diffusion particles 102 are sphere-shaped.

Embodiment 2

The design method further comprises a plurality of steps:
fixing a plurality of first diffusion particles 103 on both a second quadrangular surface and a third quadrangular surface of the dispersive prisms 101;
arranging a second coating layer 105b on a light incidence surface of the base plate 100;
arranging a plurality of second diffusion particles 104 on a surface of second the coating layer 105b against the base plate 100.

Specifically, the first diffusion particles 103 are hemispherically shaped, while a plane of a first diffusion particle 103 contacts with the second quadrangular surface or the third quadrangular surface of the dispersive prism, so as to facilitate a fixing and installation of the first diffusion particles 103 onto the dispersive prism. A diameter of the first diffusion particles 103 is 3 μm to 5 μm, the first diffusion particles 103 on the second quadrangular surface and the third quadrangular surface are all far away from the base plate 100; that is, the plurality of first diffusion particles 103 are distributed at a tip of the dispersive prism, and a height of a coverage area of the plurality of first diffusion particles 103 on the dispersive prism is ⅓ of a height of the dispersive prism, so as to increase a diffusion of a light output from the dispersive prism, and decrease a phenomenon of glare or rainbow pattern of the light emitted by the dispersive prism.

Figure 9:
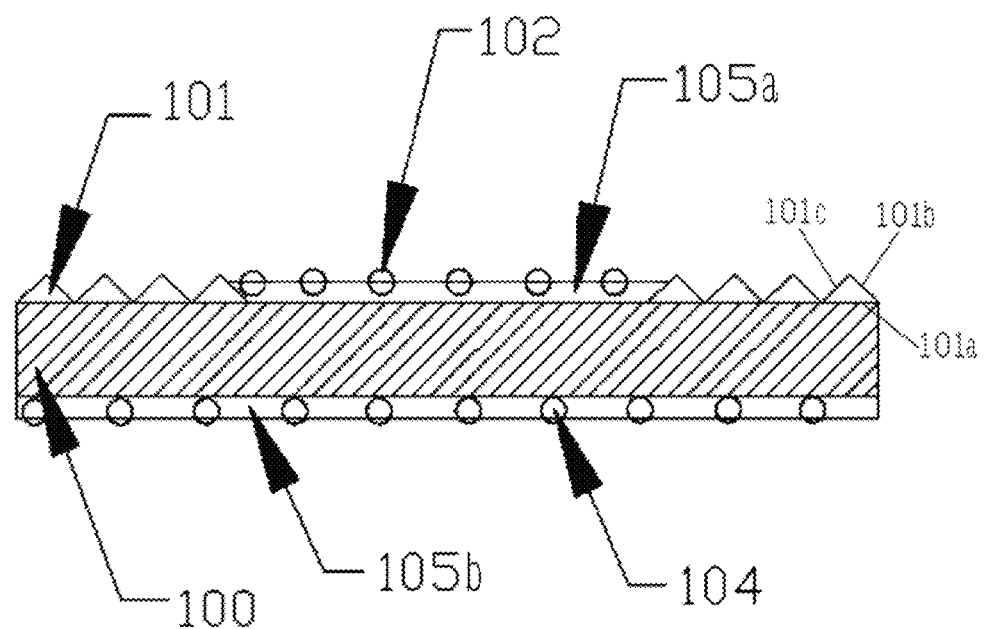
FIG. 9 illustrates a schematic structural diagram on the composite membrane in a preferred embodiment of the present disclosure.

In a preferred implementation of the embodiment, as shown in FIG. 9, a size and a structure of the dispersive prisms 101 distributed in the dispersive prisms area 4 are same, a height of the dispersive prism 101 is 30 μm, and a vertex angle of the dispersive prism 101 is 90°.

Figure 10:
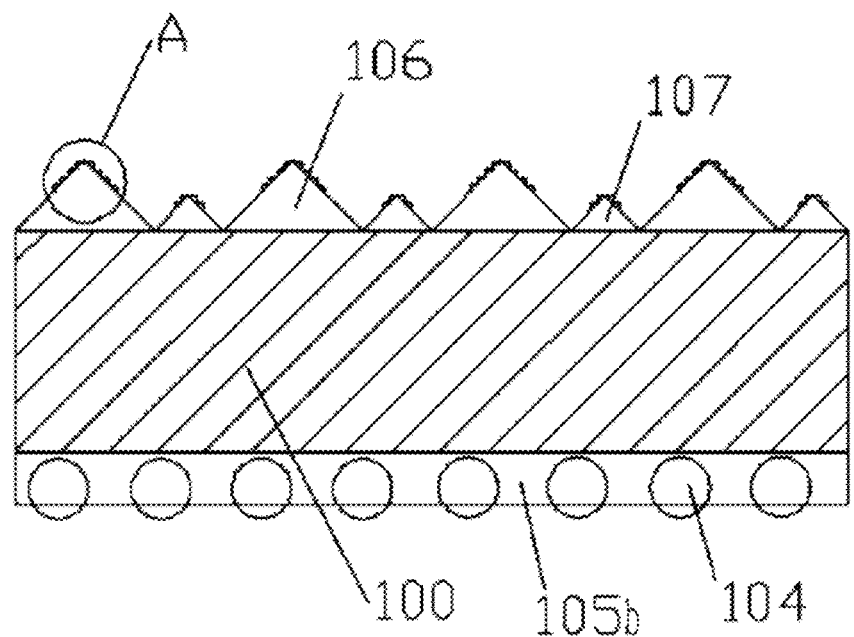
FIG. 10 illustrates a schematic structural diagram on the composite membrane in another preferred embodiment of the present disclosure.
Figure 11:
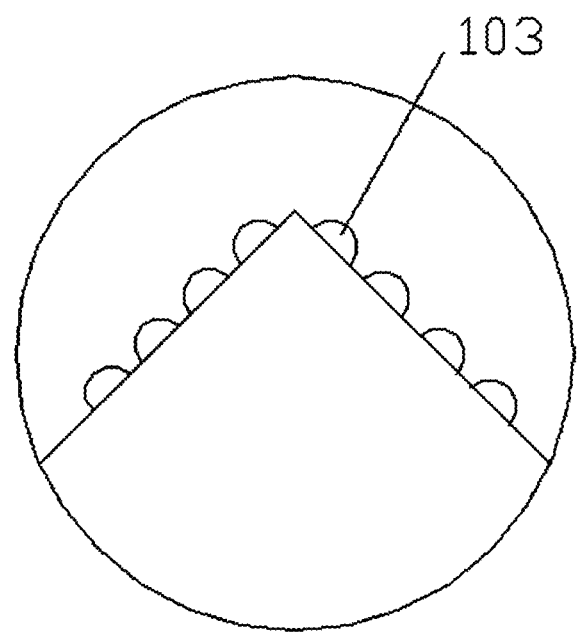
FIG. 11 illustrates a schematic diagram on a partial enlargement at point A in FIG. 10.

In another preferred implementation of the embodiment, as shown in FIGS. 10 and 11, the sizes of the dispersive prisms 101 distributed in the dispersive prism area 4 are not completely same, the dispersive prism area 4 comprises a plurality of first dispersive prisms 106 and a plurality of second dispersive prisms 107, a height of the second dispersive prisms 107 is smaller than a height of the first dispersive prisms 106, the first dispersive prism 106 and the second dispersive prism 107 are arranged alternately, and two adjacent dispersive prisms of the first dispersive prisms 106 and the second dispersive prism 107 are in contact, making the dispersive prisms in the dispersive prism area 4 arranged in a dithering way, which further destroys a uniformity of the dispersive prisms emitting light and increases the diffusivity of the light emitted by the dispersive prisms, so as to weaken the glare and the rainbow patterns. Preferably, a distance between the top of the first dispersive prism 106 and the top of the second dispersive prism 107 is 30 μm to 50 μm, both apex angles of the first dispersive prism 106 and the second dispersive prism 107 are 90°, the height of the second dispersive prism 107 is 20 μm, and the height of the first dispersive prism 106 is 30 μm.

A second coating layer 105b is coated on a light incidence surface of the base plate 100, the second coating layer 105b is arranged completely covering the light incidence surface of the base plate 100, and a plurality of second diffusion particles 104 are arranged on a surface of the second coating layer 105b against the base plate 100, to increase a foggy feeling and a wear resistance of the light incidence surface of the base plate 100. The plurality of second diffusion particles 104 are arranged in a matrix, with a gap between two adjacent second diffusion particles 104; a structure of the second diffusion particles 104 is the same as the structure of the diffusion particles 102. Preferably, the base plate 100 is a PET base plate, the second coating layer 105b is a UV photosensitive adhesive coating layer, and a diameter of both the diffusion particles 102 and the second diffusion particles 104 is 2 μm to 8 μm.

Taking the direct-lit backlight module as an example, as shown in FIGS. 3 and 4, according to a division of the rectangular test area and a calculation of the brightness uniformity, both the lamp bead shadow area 2 and the non-lamp bead shadow area 3 are obtained. Arranging a diffusion plate between the base plate 100 and the LED light sources 10, and on the base plate 100, the dispersive prisms areas 4 and lamp bead shadow areas 2 are corresponding to each other, and the diffusion pate 5 are corresponding to the non-lamp bead shadow area 3.

Figure 6:
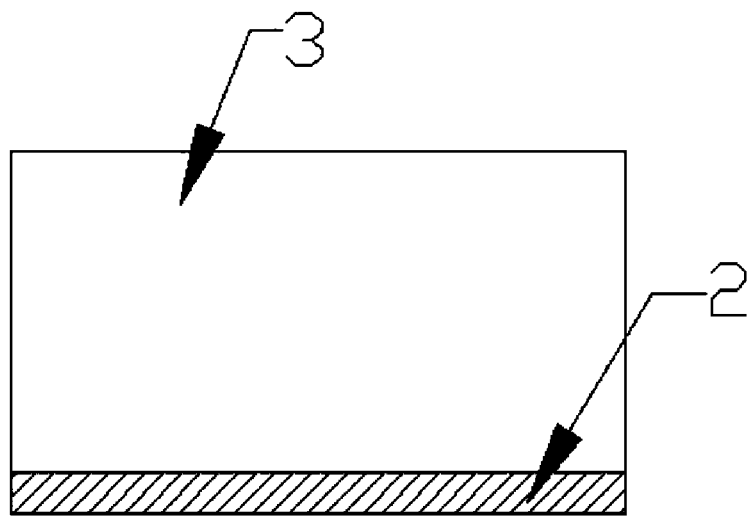
FIG. 6 illustrates a schematic diagram on a distribution of the lamp bead shadow areas and the non-lamp bead shadow areas on the test board of the side-lit backlight module in the present disclosure.

Taking the side-lit backlight module as an example, as shown in FIGS. 6 and 7, according to a division of the rectangular test area and a calculation of the brightness uniformity, both the lamp bead shadow area 2 and the non-lamp bead shadow area 3 are obtained. Arranging a diffusion plate between the base plate 100 and the LED light sources 10, and on the base plate 100, the dispersive prisms areas 4 and lamp bead shadow areas 2 are corresponding to each other and the diffusion pate 5 are corresponding to the non-lamp bead shadow area 3.

Embodiment 3

The present disclosure further provides a composite membrane, comprising a base plate 100, the base plate 100 is applied to correspond to a light source, a light-emitting surface of the base plate 100 has a plurality of dispersive prism areas 4 and a plurality of diffusion plates 5 arranged, while the dispersive prism areas 4 are corresponding to the lamp bead shadow areas 2, and the diffusion plates 5 are corresponding to the non-lamp bead shadow areas 3.

In a preferred embodiment, shown as FIG. 9, the dispersive prism area 4 comprises a plurality of dispersive prisms 101 arranged in a matrix, a first quadrangular surface of the dispersive prism 101 attaches to the base plate, a surface against the base plate 100 of a second quadrangular surface and a third quadrangular surface of the dispersive prism 101 has a plurality of first diffusion particles 103 arranged. The first diffusion particles 103 are hemispherically shaped, while a plane of the first diffusion particle 103 is in contact with the second quadrangular surface and the third quadrangular surface of the dispersive prism 101. A diameter of the first diffusion particles 103 is 3 μm to 5 μm, the first diffusion particles 103 on the second quadrangular surface and the third quadrangular surface are all far away from the base plate 100, that is, the plurality of first diffusion particles 103 are distributed at a tip of the dispersive prism, and a height of a coverage area of the plurality of first diffusion particles 103 on the dispersive prism is ⅓ of a height of the dispersive prism, so as to increase a diffusion of a light output from the dispersive prism 101, and decrease a phenomenon of glare or rainbow pattern of the light emitted by the dispersive prism 101.

The diffusion plate 5 comprises a first coating layer 105*a* arranged on the light-emitting surface of the base plate 100 and a plurality of diffusion particles 102 arranged on a surface of the first coating layer 105*a* against the base plate 100, the plurality of diffusion particles 102 are arranged in a matrix, and the diffusion particles 102 are sphere-shaped.

In a preferred embodiment, shown as FIG. 10, the dispersive prism area 4 comprises a plurality of first dispersive prisms 106 and a plurality of second dispersive prisms 107, a height of the second dispersive prisms 107 is smaller than a height of the first dispersive prisms 106, the first dispersive prism 106 and the second dispersive prism 107 are arranged alternately. Preferably, a distance between the top of the first dispersive prism 106 and the top of the second dispersive prism 107 is 30 μm to 50 μm, both apex angles of the first dispersive prism 106 and the second dispersive prism 107 are 90°, the height of the second dispersive prism 107 is 20 μm, and the height of the first dispersive prism 106 is 30 μm.

A second coating layer 105*b* is arranged on a light incidence surface of the base plate 100, and a plurality of second diffusion particles 104 are arranged into a matrix on a surface of the coating layer 105*b* against the base plate 100, a shape of the second diffusion particles is a sphere, the base plate 100 is a PET base plate, the second coating layer 105*b* is a UV photosensitive adhesive coating layer, and a diameter of both the diffusion particles 102 and the second diffusion particles 104 is 2 μm to 8 μm.

All above, the present disclosure provides a design method for a composite membrane and a composite membrane, comprising a plurality of steps: arranging a test board on a light-emitting surface of a plurality of LED light sources, and turning on the LED light sources; establishing a rectangular test area corresponding to each of the LED light sources on the test board, and detecting a brightness uniformity on each of the rectangular test areas; comparing the brightness uniformity with a preset value, defining a rectangular test area having the brightness uniformity less than the preset value as a lamp bead shadow area; and defining a rectangular test area having the brightness uniformity greater than the preset value, and a plurality of areas on the test board other than the rectangular test areas as a non-lamp bead shadow area; arranging a base plate on a light-emitting surface of the plurality of LED light sources, and arranging a plurality of dispersive prism areas and a plurality of diffusion plates on a light-emitting surface of the base plate respectively, while making an area of the dispersive prism areas correspond to that of the lamp bead shadow areas, and an area and a position of the diffusion plates area correspond to the non-lamp bead shadow areas, improving a visual effects while reducing a production cost.

It should be understood that the application of the present disclosure is not limited to the above examples. For those skilled in the art, improvements or changes can be made according to the above description, and all such improvements and changes should fall within the protection scope of the appended claims of the present disclosure.

INDUSTRIAL APPLICABILITY

The present disclosure provides a design method for a composite membrane and a composite membrane, by arranging a plurality of dispersive prism areas and a plurality of diffusion plates on the light-emitting surface of the base plate, while making the dispersive prism areas correspond to the lamp bead shadow areas, and the diffusion plates correspond to the non-lamp bead shadow areas. Arranging the dispersive prism areas in an area with an uneven light energy distribution, while laying out the diffusion plates only in an area with an even light energy distribution, without any needs to lay the dispersive prisms, so as to improve a phenomenon of uneven visual effects and reduce a production cost.

What is claimed is:

1. A design method for a composite membrane, comprising:

arranging a test board on a light-emitting side of a plurality of LED light sources, and turning on the LED light sources;

establishing a plurality of rectangular test areas corresponding to each of the LED light sources on the test board, and detecting a brightness uniformity on each of the rectangular test areas;

comparing the brightness uniformity of each of the rectangular test areas with a preset value, defining a rectangular test area having the brightness uniformity less than the preset value as a lamp bead shadow area; and defining both a rectangular test area having the brightness uniformity greater than the preset value, and a plurality of areas on the test board other than the rectangular test areas as a non-lamp bead shadow area; and arranging a base plate on a light-emitting side of the plurality of LED light sources, and arranging a plurality of dispersive prism areas and a plurality of diffusion plates on a light-emitting surface of the base plate, respectively, while making the dispersive prism areas correspond to the lamp bead shadow areas, and making the diffusion plates correspond to the non-lamp bead shadow areas;

fixing a first quadrangular surface of a plurality of dispersive prisms to the light-emitting surface of the base plate, and arranging the plurality of dispersive prisms into a dispersive prism matrix corresponding to an area and a position according to the area and position of the lamp bead shadow areas; and arranging a first coating layer with an equal area on a light-emitting surface of the base plate at a position corresponding to the non-lamp bead shadow, and arranging a plurality of diffusion particles on the first coating layer, the plurality of diffusion particles being arranged in a matrix:

fixing a plurality of first diffusion particles on both the second quadrangular surface and the third quadrangular surface of the dispersive prisms;

arranging a second coating layer on a light incidence surface of the base plate; and arranging a plurality of second diffusion particles on a surface of the second coating layer against the base plate.

2. The design method for the composite membrane according to claim 1, wherein establishing the rectangular test area corresponding to each of the LED light sources on the test board, and detecting the brightness uniformity on each of the rectangular test areas comprises:

establishing a rectangular test area corresponding to each of the LED light sources on the test board;

selecting nine test points arranged in three rows and three columns in the rectangular test area, and detecting a brightness of the nine test points respectively; and calculating a ratio of a sum of the brightness of the nine test points, except for a middle test point, to the brightness of the middle test point, and obtaining the brightness uniformity of the rectangular test area.

3. The design method for the composite membrane according to claim 2, wherein a test point in middle of the nine test points corresponds to a center of the LED light source.

4. The design method for the composite membrane according to claim 2, wherein a test point in middle of the nine test points locates at a center of the rectangular test area, a space between every two adjacent rows of the LED light sources is equal, and a space between every two adjacent columns of the LED light sources is equal.

5. The design method for the composite membrane according to claim 1, wherein the dispersive prism area comprises a plurality of first dispersive prisms and a plurality of second dispersive prisms, a height of the second dispersive prisms is smaller than a height of the first dispersive prisms, and the first dispersive prisms and the second dispersive prisms are arranged alternately.

6. The design method for the composite membrane according to claim 1, wherein:
the first diffusion particles are arranged at a tip of each of the dispersive prisms; and
a height of a coverage area of the plurality of the first diffusion particles on each dispersive prism is ⅓ of a height of the dispersive prism.

7. The design method for the composite membrane according to claim 1, wherein a structure of the diffusion particles of the first coating layer is the same as a structure of the second diffusion particles of the second coating layer.

8. A composite membrane, comprising:
a base plate, the base plate is applied to correspond to a light source, a light-emitting surface of the base plate has a plurality of dispersive prism areas and a plurality of diffusion plates arranged, while the dispersive prism areas are corresponding to a plurality of lamp bead shadow areas, and the diffusion plates are corresponding to a plurality of non-lamp bead shadow areas;
a first coating layer with an equal area arranged on a light-emitting surface of the base plate at a position corresponding to the non-lamp bead shadow;
a plurality of diffusion particles arranged on the first coating layer, the plurality of diffusion particles being arranged in a matrix;
a second coating layer arranged on a light incidence surface of the base plate; and
a plurality of second diffusion particles arranged on a surface of the second coating layer against the base plate;
wherein at least one of the dispersive prism areas comprises a plurality of dispersive prisms arranged in a matrix;
a first quadrangular surface of each of the dispersive prisms is attached to the base plate; and
each of a second quadrangular surface and a third quadrangular surface of each of the dispersive prisms has a plurality of first diffusion particles arranged thereon.

9. The composite membrane according to claim 8, wherein the base plate is a PET base plate.

10. The composite membrane according to claim 8, wherein the diffusion plate comprises a first coating layer arranged on the light-emitting surface of the base plate, and a plurality of diffusion particles arranged on a surface of the first coating layer against the base plate.

11. The composite membrane according to claim 10, wherein the first coating layer is a UV photosensitive adhesive coating layer.

12. The composite membrane according to claim 8, wherein the first diffusion particles are hemispherically shaped, while the second quadrangular surface and the third quadrangular surface of the dispersive prism are in contact with a plane of the first diffusion particles, correspondingly and respectively.

13. The composite membrane according to claim 8, wherein the dispersive prism area comprises a plurality of first dispersive prisms and a plurality of second dispersive prisms, a height of the second dispersive prism is smaller than a height of the first dispersive prism, while the first dispersive prism and the second dispersive prism are arranged alternately.

14. The composite membrane according to claim 13, wherein a distance from a top of the first dispersive prism and a top of the second dispersive prism is 30 μm-50 μm.

15. The design method for the composite membrane according to claim 8, wherein:
the first diffusion particles are arranged at a tip of each of the dispersive prisms; and
a height of a coverage area of the plurality of the first diffusion particles on each dispersive prism is ⅓ of a height of the dispersive prism.

16. The composite membrane according to claim 8, wherein a structure of the diffusion particles of the first coating layer is the same as a structure of the second diffusion particles of the second coating layer.

* * * * *